Patented Aug. 23, 1949

2,479,629

UNITED STATES PATENT OFFICE 2,479,629

ALKALI-ORGANIC SOLVENT PAINT REMOVER

Lester E. Kuentzel, Wyandotte, Mich., and Ralph H. McKee, New York, N. Y., assignors to Wyandotte Chemicals Corporation, Wyandotte, Mich., a corporation of Michigan No Drawing. Application February 8, 1946, Serial No. 646,508

3 Claims. (Cl. 252—138)

The present invention relates to a composition for removing or stripping paint, varnish, lacquer and enamel from wood, glass, fabric and metal surfaces. As indicated by the title, the paint remover composition made according to the principle of our invention, consists essentially of inorganic alkaline compounds, alkali metal xylene sulfonates and organic solvent ingredients.

Heretofore, organic solvents, such as benzene hydrocarbons, aliphatic alcohols, ketones, ethers, esters and chlorinated organic compounds have found extensive use in the paint stripping art due to certain advantages possessed thereby, more especially their relatively high stripping or paint solvent powers. On the other hand, inorganic alkalies such as caustic soda and alkaline sodium salts have also been used as the basis of paint remover compositions which display the advantages of non-inflammability, non-volatility, non-toxicity, use in water solution, and relatively low cost.

The organic solvents have generally been subject to the objections of relatively high cost, rapid evaporation and inability to be used in heated solutions, and corrosive attack on metals. Conversely, the inorganic alkalies, although relatively cheap and adaptable for use in heated solutions, do not possess the high stripping or solvent power of the organic solvents.

It is the general object and nature of our present invention to provide a paint remover composition incorporating the advantages of both the alkaline and the organic solvent type of paint remover compositions, while at the same time avoiding the disadvantages heretofore encountered. A further object of our invention is to provide a paint remover composition which is non-corrosive to a substantial majority of the ferrous and non-ferrous metal surfaces to which it is most likely to be applied.

In the co-pending application of Lester E. Kuentzel, co-applicant herein, filed January 25, 1946, Serial No. 643,467, there has been disclosed an alkali-organic solvent type paint remover composition consisting of water soluble alkali metal inorganic salts and the mono- and polyethylene glycol monobutyl ethers. This composition of the aforesaid co-pending application, when in concentrated form, and prior to its subsequent dilution with water for use, consists of a liquid and a solid phase. By limited dilution with water the solid-liquid system may be resolved into a two liquid system, as set forth in the copending application above referred. For the purpose of convenience in packaging, handling and use of such a composition, it has been found highly desirable to effect, if possible, a blending or miscegenation of these heterogeneous systems into a single, homogeneous phase. Our instant invention has solved this problem through the discovery that an alkali metal xylene sulfonate (i. e., the sodium, potassium, lithium, rubidium, cesium, and ammonium salts of xylene sulfonic acid), when added in the range of 15 to 20% by weight and water in the amount of about 50% by weight or more of the original alkali-organic solvent ingredients, results in a uniform composition in which the ingredients co-exist in concentrated form in a single liquid phase which may be diluted with water to any desired extent for use.

In formulating our paint remover composition, we first prepared a water solution of alkali metal xylene sulfonate by heating it in the proportion of 50 to 100 g. per 100 ml. of water (e. g., 100–200 parts by weight of water per 100 parts of sodium xylene sulfonate) at a nearly boiling temperature. To this hot solution is added the mixture of the alkali metal inorganic salts and lastly the ethylene glycol monobutyl ether, such as set forth in the aforesaid co-pending application. There then results a homogeneous, single liquid phase composition which does not separate out into layers or multiple liquid phases on cooling or standing, nor on subsequent further dilution with water for use. A slight flocculent precipitate may form on addition of the ethylene glycol monobutyl ether, but this precipitate settles to the bottom, and the amber colored, single-phase, liquid is easily decanted.

The alkali metal inorganic salts are found to be best operative in the accomplishment of this objective, when present in the amount of 9–15% by weight of the total composition; (viz.: on concentrate basis and not on final diluted aqueous solution basis).

Alternative formulation procedures can be used, such as by mixing a portion of the alkali metal xylene sulfonate with the alkali metal inorganic salts and some added water while mixing another portion of the xylene sulfonate with the mono- or polyethylene glycol monobutyl ethers, then admixing both of the so prepared solutions with each other while hot. However, irrespective of the particular procedure or technique of formulation, we have determined that the proportion of xylene sulfonate in the final mixture lies in the effective operating range of 15 to 20% by weight of the total amount of other ingredients, in order to achieve the objective of the present invention.

It is necessary in preparing this homogeneous, single liquid phase material in its relatively concentrated form for packaging and handling, and prior to its subsequent water dilution for use to provide at least 50% water in the alkali metal inorganic salt-ethylene glycol monobutyl ether-xylene sulfonate mixture in order to avoid separation into two liquid layers.

The following examples of formulated compositions embodying the principle of our invention will further serve to illustrate same and enable those skilled in the art more readily to understand and practice it. These examples are given by way of illustration, and not in limitation, of the invention.

EXAMPLE 1

(FORMULATION 82A)

| Constituent | Parts by Weight | Per Cent by Weight |
|---|---|---|
| Water | 75.0 | 55.12 |
| Sodium Metasilicate (pentahydrate) | 7.5 | 5.51 |
| Sodium Carbonate | 3.42 | 2.51 |
| Sodium Bicarbonate | 2.28 | 1.67 |
| Wetting Agent ("M. P. 189") | .3 | 0.22 |
| Sodium Xylene Sulfonate (purified) | 25.0 | 18.37 |
| Ethylene Glycol Monobutyl Ether ("Butyl Cellosolve") | 22.6 | 16.60 |
|  |  | 100.00 |

"M. P. 189" is the trade name of a sodium alkyl sulfonate derived from the reaction with chlorine and sulfur dioxide, of a liquid aliphatic hydrocarbon, such as a petroleum hydrocarbon distillate boiling in the range of 250–360° C., followed by saponification or neutralization, cf. U. S. Pat. No. 2,197,800. Hence, it is chemically identified as a "$C_{13-20}$ alkyl sulfonate."

EXAMPLE 2

(FORMULATION 866)

In this exemplary formulation diethylene glycol monobutyl ether or "Butyl Carbitol" replaces the "Butyl Cellosolve" of Example 1:

| Constituent | Parts by Weight | Per Cent by Weight |
|---|---|---|
| Water | 75.0 | 54.65 |
| Sodium Metasilicate (pentahydrate) | 7.5 | 5.48 |
| Sodium Carbonate | 3.42 | 2.49 |
| Sodium Bicarbonate | 2.28 | 1.66 |
| Wetting Agent ("M. P. 189") | .3 | .22 |
| Sodium Xylene Sulfonate (purified) | 25.0 | 18.20 |
| Diethylene Glycol Monobutyl Ether ("Butyl Carbitol") | 23.7 | 17.30 |
|  |  | 100.00 |

EXAMPLE 3

(FORMULATION 153A)

This example, rather than using a purified or dehydrated sodium xylene sulfonate, such ingredient is conveniently incorporated into the formulation in the form of a 40% sodium xylene sulfonate solution. The specific formulation for such a composition is as follows:

| Constituent | Percent by Weight | Water Content | Sodium Xylene Sulfonate Content |
|---|---|---|---|
|  |  | Per cent | Per cent |
| 40% Sodium Xylene Sulfonate | 43.16 | 26.00 | 17.3 |
| Water | 29.72 | 29.72 |  |
| Sodium Metasilicate (pentahydrate) | 5.72 |  |  |
| Sodium Carbonate | 2.82 |  |  |
| Sodium Bicarbonate | 1.46 |  |  |
| Wetting Agent ("M. P. 189") | 0.30 |  |  |
| Ethylene Glycol Monobutyl Ether ("Butyl Cellosolve") | 16.72 |  |  |
|  | 100.00 | ¹ 55.72 |  |

¹ Total water.

EXAMPLE 4

(FORMULATION 153B)

In this example, "Butyl Carbitol" is substituted for the "Butyl Cellosolve" of Example 3:

| Constituent | Percent by Weight | Water Content | Sodium Xylene Sulfonate Content |
|---|---|---|---|
|  |  | Per cent | Per cent |
| 40% Sodium Xylene Sulfonate | 42.74 | 25.64 | 17.1 |
| Water | 29.50 | 29.50 |  |
| Sodium Metasilicate (pentahydrate) | 5.68 |  |  |
| Sodium Carbonate | 2.80 |  |  |
| Sodium Bicarbonate | 1.45 |  |  |
| Wetting Agent ("M. P. 189") | 0.29 |  |  |
| Diethylene Glycol Monobutyl Ether ("Butyl Carbitol") | 17.44 |  |  |
|  | 100.00 | ¹ 55.14 |  |

¹ Total water.

EXAMPLE 5

(FORMULATION 106A)

We have also discovered that a small amount, viz. a fraction of 1% of a chloride such as $FeCl_3$, $AlCl_3$ or $HCl$, permits the preparation of a relatively more concentrated formulation, such as one in which a portion of sodium xylene sulfonate may be increased. This is illustrated by the following example in which a fractional percentage of ferric chloride is added:

| Constituent | Parts by Weight | Percent by Weight |
|---|---|---|
| Water | 75.0 | 55.08 |
| Ferric Chloride | .25 | .18 |
| Sodium Metasilicate | 7.50 | 5.5 |
| Sodium Carbonate | 3.42 | 2.5 |
| Sodium Bicarbonate | 2.28 | 1.67 |
| Wetting Agent ("M. P. 189") | .3 | .22 |
| Sodium Xylene Sulfonate (purified) | 25.0 | 18.30 |
| Ethylene Glycol Monobutyl Ether ("Butyl Cellosolve") | 22.6 | 16.55 |
|  | 136.35 | 100.00 |

If crude rather than purified xylene sulfonate is used, the amount of sodium carbonate added as a constituent, may be reduced in proportion to the amount of sodium carbonate contaminate already present in the crude sodium xylene sulfonate. Thus, where crude rather than purified sodium xylene sulfonate is used in the exemplary formulations herein given, appropriate adjustment should be made in the amount of sodium carbonate and crude xylene sulfonate respectively, which are incorporated into the composition.

"Modified soda," a product of the ammonia-soda process and in which sodium carbonate and bicarbonate are apparently chemically or molecularly combined in proportions of about 1.5 mols $Na_2CO_3$ per mol of $NaHCO_3$ may be conveniently used in our compositions in place of the mere physical admixture of these two ingredients.

EXAMPLE 6

(FORMULATION 128A)

We have also discovered that ethylene dichloride which has excellent paint solvent powers may be added in amounts up to 5% by volume of the above described compositions, and without disturbing the single liquid phase, homogeneous, physical properties. Thus, by way of further example, the addition of 3% by volume of ethylene dichloride to the composition of Example 2 results in a paint remover composition of excellent stripping properties and in the form of a single liquid phase material.

The paint stripping power of the above described compositions is set forth in the following table wherein such compositions were applied to U. S. Navy Aeronautical test panels 70, 72 and 75 as recited in Navy Aeronautical Specification C-67 c.; the U. S. Army Air Force test panels 14105 and 14109, as recited in Army Air Force Specification No. 14119; and to a test panel denoted "zinc chromate" which was coated only with the zinc chromate primer employed in the aforesaid Navy specification. The detailed descriptions of these stripping test panels are set forth in the co-pending applications Serial No. 509,121 filed November 5, 1945, now U. S. Pat. No. 2,433,517, and/or Serial No. 643,467 filed January 25, 1946.

*Table I*

| Composition Of— | Stripping Power (time in minutes to loosen coating completely on the following panels*) | | | | | |
|---|---|---|---|---|---|---|
| | 70 | 72 | 75 | 14,105 | 14,109 | Zinc Chromate |
| Example 1[1] | 7 | 9 | 13 | 40 | 50 | |
| Example 1[2] | | | | 20 | 35 | 8⅓ |
| Example 2[1] | 8 | 10 | 14 | 45 | 55 | |
| Example 3[1] | | 10 | 15 | 25 | 20 | 10 |
| Example 4[1] | | 10 | 15 | 25 | 20 | 10 |
| Example 5[2] | | | | | | 10 |
| Example 6[2] | | | | | 6⅔ | 8⅓ |

\* At 140–150° F. temperature.
[1] Composition diluted with $H_2O$, 1:4.
[2] Composition diluted with $H_2O$, 1:3.

The above described compositions, on being tested for possible metallic corrosion effects, showed no attack on 3S bright aluminum, 3S anodized aluminum, iron or copper, when subjected to the usual 2 hours contact time corrosion test at working temperature.

In the manufacture and use of the above described paint remover compositions, particularly those which are relatively highly concentrated such as in the case of the formulations of Examples 4 and 5, certain single precautions should be observed in order to maintain the single-phase condition. If the mixture is heated excessively during the solution of the alkalies and sufficient water is evaporated, the formulations will separate upon the addition of the solvents. It is necessary to maintain the original volume of water by additions of water to make up for loss by evaporation during manufacture. The finished product should then be placed in tight containers. These latter remarks, of course, apply to the alkali-organic solvent-sodium xylene sulfonate-water concentrate during manufacture and storage.

When the concentrate is diluted with an additional amount of water and put to use by the consumer, such as by use in an immersion bath or stripping tank, another two-liquid layer separation may occur in the diluted, working solution as it stands in the stripping tank. If the working or diluted solution evaporates excessively, the solvent will separate and come to the surface. Here it is readily seen. The addition of water to make up for the loss by evaporation will restore the tank stripper to its original condition. The solvents, "Butyl Cellosolve" or "Butyl Carbitol," have high boiling points and do not evaporate excessively at the low temperature (140° F.) of the stripping solution. Hence, only water need be added for make-up.

In the appended claims, it is to be understood that the term "alkali metal" includes the elements and radicals as hereinbefore defined, namely: Na, K, Li, Rb, Cs and $NH_4$; and that the term "an ethylene glycol monobutyl ether" includes both the mono- and poly-ethylene glycol monobutyl ethers.

Equivalent modes of practicing our invention may be followed provided that they are within the scope and purview of the appended claims.

We, therefore, distinctly claim and particularly point out as our invention:

1. An alkali-organic solvent type paint remover composition in the form of a single, homogeneous liquid phase, consisting of by weight, at least 50% water, 9 to 15% of a mixture of sodium metasilicate, sodium carbonate and sodium bicarbonate each present in an appreciable proportion with respect to each other, 15 to 20% alkali metal xylene sulfonate, and the balance ethylene glycol monobutyl ether.

2. An alkali-organic solvent type paint remover composition in the form of a single, homogeneous liquid phase, consisting of by weight, at least 50% water, 9 to 15% of a mixture of sodium metasilicate, sodium carbonate and sodium bicarbonate each present in an appreciable proportion with respect to each other, 15 to 20% sodium xylene sulfonate, the balance ethylene glycol monobutyl ether, and not over 5% by volume on the basis of said mixture of ethylene dichloride.

3. A paint remover composition in the form of a single, homogeneous liquid phase, and adapted to be diluted with 3 to 4 times its volume of water for use, comprising the following ingredients formulated in approximately the correspondingly stated percentages by weight:

| Constituent | Per cent by weight |
|---|---|
| 40% sodium xylene sulfonate | 43.16 |
| Water | 29.72 |
| Sodium metasilicate, pentahydrate | 5.72 |
| Sodium carbonate | 2.82 |
| Sodium bicarbonate | 1.46 |
| $C_{13-20}$ alkyl sulfonate wetting agent | 0.30 |
| Ethylene glycol monobutyl ether | 16.72 |
| | 100.00 |

LESTER E. KUENTZEL.
RALPH H. McKEE.

REFERENCES CITED

The following references are of record in the file of this patent:

UNITED STATES PATENTS

| Number | Name | Date |
|---|---|---|
| 1,000,162 | Ellis | Aug. 8, 1911 |
| 1,531,328 | Wotherspoon | Mar. 31, 1925 |
| 1,657,147 | Brainard | Jan. 24, 1928 |
| 1,812,321 | Davidson | June 30, 1931 |
| 1,993,096 | Hodges | Mar. 5, 1935 |